US006665256B2

United States Patent
Tanaka et al.

(10) Patent No.: US 6,665,256 B2
(45) Date of Patent: Dec. 16, 2003

(54) FLOATING CHASSIS FIXING DEVICE FOR A DISC PLAYER

(75) Inventors: Shinsaku Tanaka, Tokyo (JP); Toshio Yoshimura, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 167 days.

(21) Appl. No.: 10/054,899

(22) Filed: Jan. 25, 2002

(65) Prior Publication Data

US 2003/0039194 A1 Feb. 27, 2003

(30) Foreign Application Priority Data

Aug. 21, 2001 (JP) ..................... 2001-250007

(51) Int. Cl.$^7$ ............................................. G11B 17/04
(52) U.S. Cl. ............................................... 369/77.1
(58) Field of Search ........................... 369/75.1, 75.2, 369/77.1, 77.2

(56) References Cited

U.S. PATENT DOCUMENTS

| | | | |
|---|---|---|---|
| 4,325,133 A | 4/1982 | Reitmayer | |
| 4,628,498 A | 12/1986 | Takamatsu et al. | |
| 4,680,748 A | 7/1987 | Kobayashi | |
| 4,701,901 A | 10/1987 | Imai | |
| 4,764,917 A | 8/1988 | Sugihara et al. | |
| 5,119,354 A | * 6/1992 | Umesaki | 369/30.9 |
| 5,274,619 A | * 12/1993 | Suzuki | 369/77.1 |
| 5,278,819 A | 1/1994 | Shimegi et al. | |
| 5,321,687 A | 6/1994 | Kinoshita et al. | |
| 5,381,393 A | 1/1995 | Ohtani | |
| 5,410,533 A | 4/1995 | Ohsaki et al. | |
| 5,500,838 A | 3/1996 | Matsumoto et al. | |
| 5,587,856 A | 12/1996 | Aoyama | |
| 5,596,561 A | 1/1997 | Toyoguchi | |
| 5,602,818 A | * 2/1997 | Kage et al. | 369/75.2 |
| 5,608,705 A | 3/1997 | Tanaka | |
| 5,684,777 A | 11/1997 | Fukuyama et al. | |
| 5,687,145 A | 11/1997 | Takashina et al. | |
| 5,701,290 A | 12/1997 | Okada | |
| 5,764,612 A | 6/1998 | Tanaka et al. | |
| 5,768,240 A | 6/1998 | Hiraga | |
| 5,901,130 A | 5/1999 | Fukuyama et al. | |
| 5,970,042 A | 10/1999 | Fujimoto et al. | |
| 5,995,468 A | 11/1999 | Furukawa | |
| 6,009,062 A | 12/1999 | Nashimoto et al. | |
| RE36,709 E | 5/2000 | Matsumoto et al. | |
| 6,058,090 A | 5/2000 | Wang et al. | |
| 6,111,837 A | 8/2000 | Watanabe et al. | |
| 6,111,838 A | 8/2000 | Akiba | |
| 6,141,310 A | 10/2000 | Tanaka et al. | |
| 6,181,671 B1 | 1/2001 | Ikawa et al. | |
| 6,185,180 B1 | 2/2001 | Morishita | |
| 6,229,781 B1 | 5/2001 | Fujisawa | |
| 6,335,914 B2 | 1/2002 | Tanaka et al. | |
| 6,345,027 B1 | 2/2002 | Saji et al. | |
| 2001/0001267 A1 | 5/2001 | Fujiwara | |
| 2001/0017835 A1 | 8/2001 | Koshino et al. | |
| 2001/0050898 A1 | 12/2001 | Tanaka | |
| 2002/0015374 A1 | 2/2002 | Abe | |

FOREIGN PATENT DOCUMENTS

JP    11-120660    10/1997

* cited by examiner

*Primary Examiner*—David L. Ometz

(57) ABSTRACT

A simplified device is provided for fixing a floating chassis to a main chassis. The floating chassis fixing device has a control member movably mounted on one side of the floating chassis, a push-in member for transferring a disc to a playing position and a disc guide for guiding the disc to the playing position, which are coupled to the control member such that they are interlocked. When no disc is loaded, the control member, the push-in member and the disc guide are engaged with the main chassis to fix the floating chassis to the main chassis.

5 Claims, 8 Drawing Sheets

FLOATING CHASSIS FIXING DEVICE FOR A DISC PLAYER

BACKGROUND OF THE INVENTION

1. Field of the Invention

The present invention relates an improvement in a disc transfer apparatus which relies on a spring force for inserting a disc and on a motor for removing the disc.

2. Description of the Related Art

A disc player mainly for use in a vehicle has a floating chassis mounted with a pickup, a turntable and a damper and is supported within a main chassis in a floating state in forward and backward, right and left, and up and down directions. The floating chassis is supported in the floating state in the main chassis to insulate the main chassis from shock being transferred to the pickup thereby preventing the dropout of reproduced sound from a disc. On the other hand, when a disc is inserted into or ejected from the disc player, the floating chassis is fixed to the main chassis to facilitate the insertion or ejection of the disc.

A conventionally known floating chassis fixing device for fixing a floating chassis supported within a main chassis in a floating state is described in Laid-open Japanese Patent Application No. 2000-339835.

Specifically, the aforementioned reference shows a structure which has a frame (1) of a disc player provided with engagement holes (15, 17) in plates on both sides, and a main chassis (2) provided with slide cam plates (5, 6) on plates on both sides such that the right and left slide cam plates (5, 6) are coupled to each other through link levers (10a, 10b, 10c). To play a disc, the slide cam plates (5, 6) are moved in an outward direction to position lock pins (16, 18) provided on the respective slide cam plates (5, 6) into larger diameter portions (15b, 17b) of the engagement holes (15, 17) to cause the main chassis (2) to float with respect to the frame (1). For inserting or ejecting a disc, the slide cam plates (5, 6) are moved in the return direction to engage the lock pins (16, 18) with the lock portions (15a, 17a) of the engagement holes (15, 17) so as to fix the main chassis (2) to the frame (1).

In the aforementioned floating chassis fixing device, the slide cam plates (5, 6) are provided for the plates on both sides of the main chassis (2) and these right and left slide cam plates (5, 6) are coupled to each other through the link levers (10a, 10b, 10c) for synchronization. As such, a number of parts are required which makes the structure complicated. In addition, the need for the right and left slide cam plates (5, 6) causes a disadvantage of a large width dimension of the overall disc player.

SUMMARY OF THE INVENTION

The present invention has been made to solve such problems, and it is an object of the invention to provide a floating chassis fixing device for a disc player which is simple in structure and reduced in size.

A floating chassis fixing device for a disc player according to the present invention comprises a disc guide for guiding a disc to a playing position and a push-in member for transferring a disc to the playing position such that the disc guide and the push-in member are pivotally moved. The floating chassis fixing device further comprises a control member for separating a disc damper from a disc when the disc is ejected. The disc guide and the push-in member are pivoted in association with a movement of the control member to abut the control member, the disc guide and the push-in member to the main chassis, thereby fixing the floating chassis to the main chassis.

In this manner, the disc guide inherently included in the disc player can be pivotally moved, and the disc guide is abutted to the main chassis together with the push-in member and the control member such that the floating chassis is fixed to the main chassis. Thus, the floating chassis can be fixed without increasing the number of parts so as to simplify the structure. In addition, since the control member is required to be disposed only on one side of the floating chassis, the width dimension of the overall floating chassis can be reduced.

Particularly, when the disc guide is engaged with a side plate of the main chassis by fitting a convex portion into a concave portion, a mechanism for fixing them is further simplified.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

Figure 1:
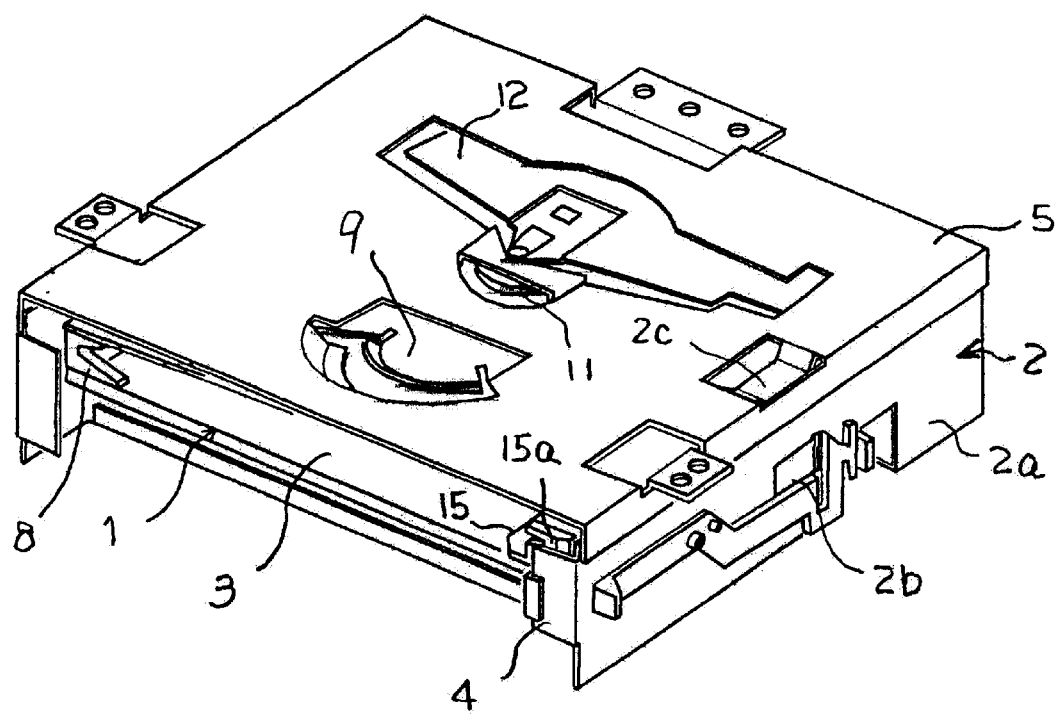
FIG. 1 is a perspective view illustrating the outer appearance of a disc player according to the present invention.

A floating chassis fixing device for a disc player according to the present invention is described below with reference to FIGS. 1 to 8. FIG. 1 shows the outer appearance of the disc player. An elongated disc insertion slot 3 for inserting a disc is formed on the front surface of a main chassis 2 which contains a floating chassis 1 therein, and a front wall 4 with a small width is formed on the right of the insertion slot 3. The floating chassis 1 is supported within the main chassis 2 movably (in a floating state) in up and down, right and left, and forward and backward directions. The up and down direction refers to a vertical direction with respect to the discoid surface of a disc inserted into the insertion slot, the right and left direction refers to a longitudinal direction of the insertion slot 3, and the forward and backward direction refers to a transfer direction of a disc, with the position of the insertion slot 3 defined as the front.

Figure 2:
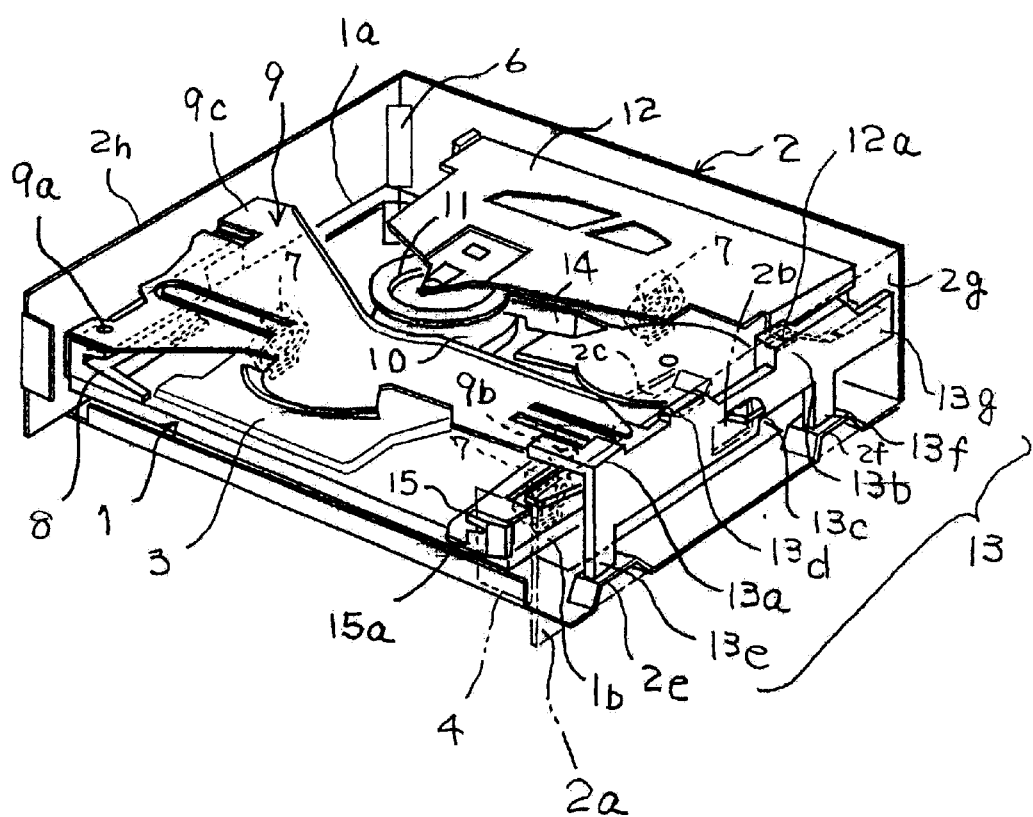
FIG. 2 illustrates the inside of the disc player of FIG. 1.

FIG. 2 is a perspective view of the floating chassis 1 viewed obliquely from a position above the insertion slot 3 with a cover 5 removed from the main chassis 2 in FIG. 1 and a portion of a right wall 2a of the main chassis 2 omitted. The floating chassis 1 is supported at corners of its generally square shape on the main chassis 2 by springs 6. Dampers 7 are attached between the floating chassis 1 and the main chassis 2 for damping free vibrations by the springs 6.

A straight guide 8 is provided on a left side 1a of the floating chassis 1, extending along the outer periphery of a disc inserted into the insertion slot to guide the disc to a playing position. A guide plate 9 (i.e., the disc guide) made of metal is also provided above the floating chassis 1 closer to the insertion slot for guiding a disc inserted into the insertion slot 3 to the playing position. The guide plate 9 has a generally triangular shape and is pivotally supported about an axis hole 9a formed in its vertex portion on a spindle of the straight guide 8. One end 9b of the triangle is extended to a right side 1b of the floating chassis 1 and the other end 9c is extended backward along the left side 1a of the floating chassis 1. A disc inserted into the insertion slot 3 is guided to the playing position through a space formed between the floating chassis 1 and the guide board 9.

A turntable 10 for turning the disc and a damper 11 for sandwiching the disk between the turntable and itself are disposed in the center of the floating chassis 1. The damper 11 is supported on a support plate 12 pivotally mounted on the floating chassis 1. A slide member (i.e., the control member) 13 movable in the forward and backward directions is mounted on the right side 1b of the floating chassis 1. The slide member 13 is moved backward by a disc ejecting operation, and in this event, the slide member 13 pivots the support plate 12 upward to separate the damper 11 from the turntable 10 and abuts to the main chassis 2 to fix the right side 1b of the floating chassis 1 to the main chassis 2.

The aforementioned slide member 13 is formed with a coupling portion 13a for coupling to the one end 9b of the guide plate 9, and the first through sixth convex portions 13b to 13g of the slide member 13. The coupling portion 13a pivots the guide plate 9 about the axis hole 9a in association with a movement of the slide member 13. The first convex portion 13b is formed on an upper edge of the slide member 13, and it engages with a tongue 12a of the support plate 12 to separate the damper 11 from the turntable 10 as the slide member 13 is moved backward. The second convex portion 13c is formed to face the inner surface of the right wall 2a of the main chassis 2, and it abuts to the inner surface of the right wall 2a to prevent a rightward movement of the floating chassis 1 when the slide member 13 is moved backward. On the other hand, a relief hole 2b for receiving the second convex portion 13c is provided for the right wall 2a such that the second convex portion 13c faces the relief hole 2b to permit a rightward movement of the floating chassis 1 when the slide member 13 is moved forward.

The third convex portion 13d is formed in the center on the upper edge of the slide member 13, and it abuts to a bottom surface of a bent piece 2c formed on the cover 5 of the main chassis 2 to prevent an upward movement of the floating chassis 1 when the slide member 13 is moved backward. The fourth and fifth convex portions 13e, 13f are formed on a lower edge of the slide member 13 at the front and back, and they get on angle pieces 2e, 2f formed on the bottom of the main chassis 2 to prevent a downward movement of the floating chassis when the slide member 13 is moved backward. The sixth convex portion 13g is formed on a rear end of the slide member 13, and it abuts to a rear wall 2g (i.e., rear end) of the main chassis 2 to prevent a backward movement of the floating chassis 1 when the slide member 13 is moved backward.

On the top surface of the floating chassis 1, mounted pivotally are a push-back lever 14 for pushing a disc back to the insertion slot 3 from the playing position and a push-in lever 15 (i.e., push-in member) for pushing a disk in to the playing position from the insertion slot 3 following the pivotal movement of the push-back lever 14 in the reverse direction. The push-in lever 15 has a push-in piece 15a formed with a horizontal V-shaped groove extending toward the insertion slot 3.

The push-in lever 15 prevents a forward movement of the floating chassis 1 by opposing the push-in piece 15a to an inner surface 4a (i.e., front end) of the front wall 4 of the main chassis 2 when no disc is loaded on the floating chassis 1. When a disc inserted from the insertion slot 3 is pushed in toward the playing position, the push-in piece 15a is separated from the inner surface 4a of the front wall 4 to permit a forward movement of the floating chassis 1.

Figure 3:
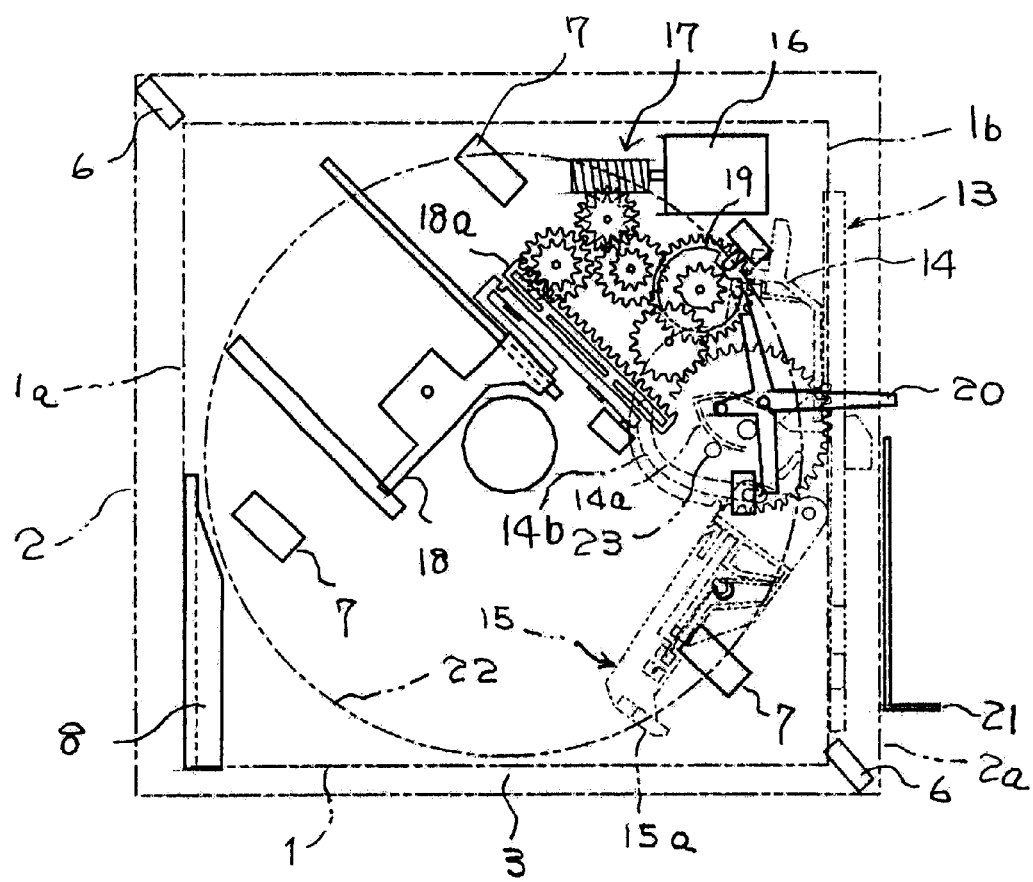
FIG. 3 illustrates a path on which power from a motor is transmitted.
Figure 4:
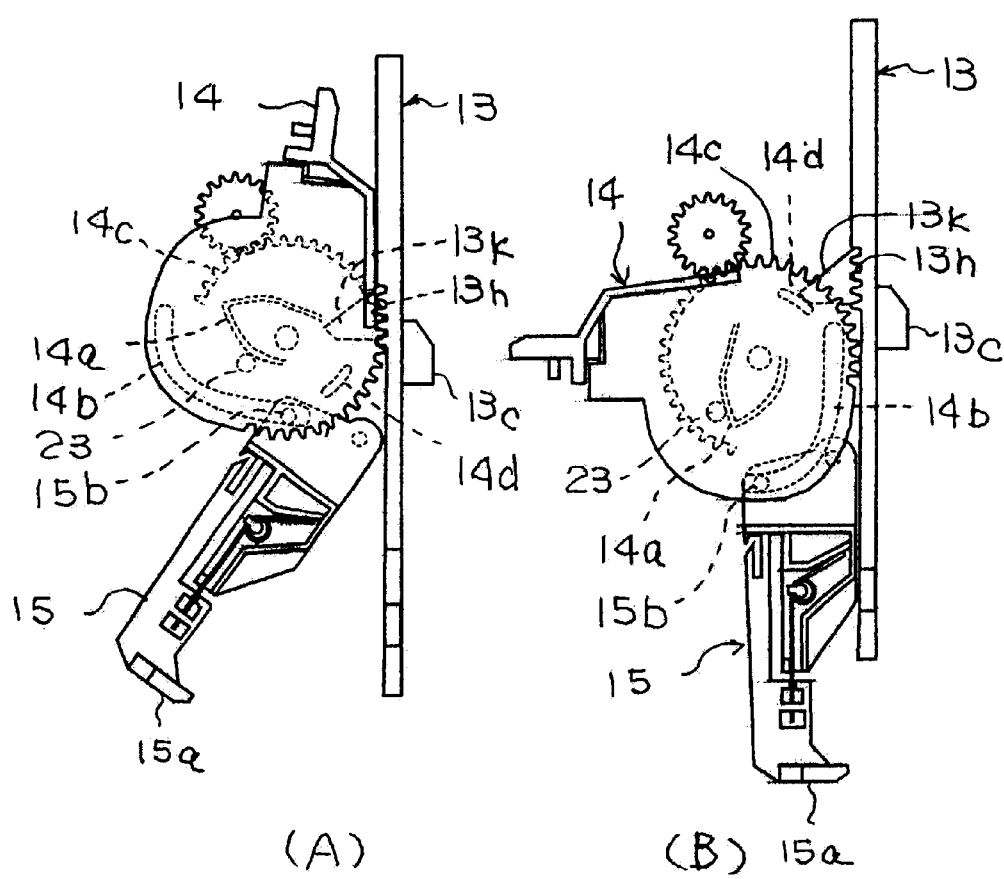
FIGS. 4(A) and 4(B) illustrate a path on which power to a slide member is transmitted.

FIG. 3 shows a drive mechanism for driving the push-back lever 14 and the push-in lever 15. A motor 16 is mounted on the floating chassis 1 shown by an imaginary line. The power of the motor 16 is transmitted to a long rack 18a of a pickup 18 through a gear train 17. A toothless gear 19 is included in the gear train 17. The toothless gear 19 is normally held by a trigger lever 20 at a position to which the power of the motor 16 is not transmitted. The trigger lever 20 is pushed by an eject ever 21 attached to the right wall 2a of the main chassis 2 for rotation so as to release the holding of the toothless gear 19, which is rotated by the power of the motor 16 to rotate the push-back lever 14 in a counterclock-wise direction in FIG. 3. Thus, the push-back lever 14 pushes back the disc 22 at the playing position toward the insertion slot 3.

The push-back lever 14 is formed with an angle cam 14a near the center of rotation, and a roller 23 is pressed against the angle cam 14a. The roller 23 is pushed back by the angle cam 14a when the push-back lever 14 is rotated, but it rotates the push-back lever 14 by the pressing force as it passes the peak of the angled cam 14a. In other words, the angle cam 14a and the roller 23 constitute a reversing mechanism. The push-back lever 14 is also formed with a groove cam 14b into which a pin 15b of the push-in lever 15 is fit to interlock the push-in lever 15 and the push-back lever 14.

As shown in FIG. 4A, the push-back lever 14 is formed with a partial gear 14c for engaging with a rack 13h of the slide member when the disc 22 is fed to the playing position and an arc cam 14d for securing the slide member 13 to a backward position. When the disc 22 is fed to the playing position, the partial gear 14c engages with the tack 13h to move the slide member 13 forward. As shown in FIG. 4B, the arc cam 14d abuts to a projecting piece 13k formed on the slide member to prevent a forward movement of the slide member 13 before the slide member 13 is moved forward.

Figure 5:
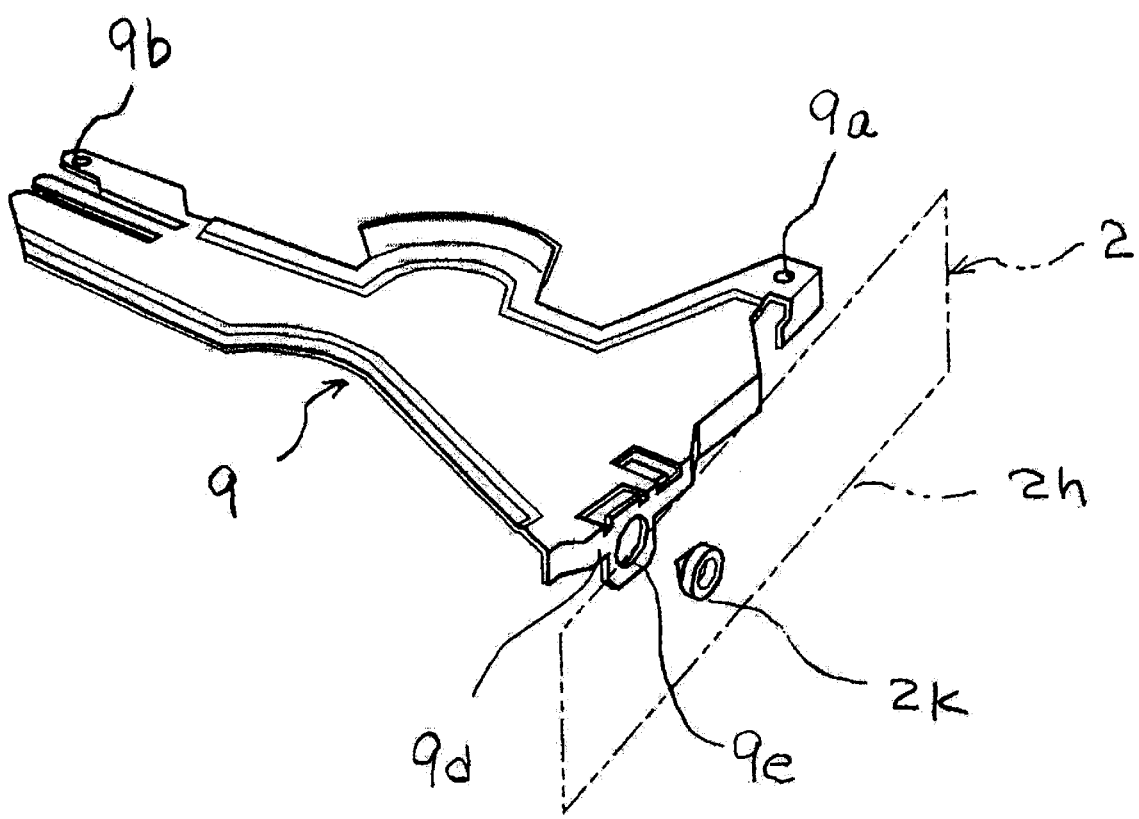
FIG. 5 illustrates a guide plate and a surface on the side of a main chassis before the guide engages with the surface.
Figure 6:
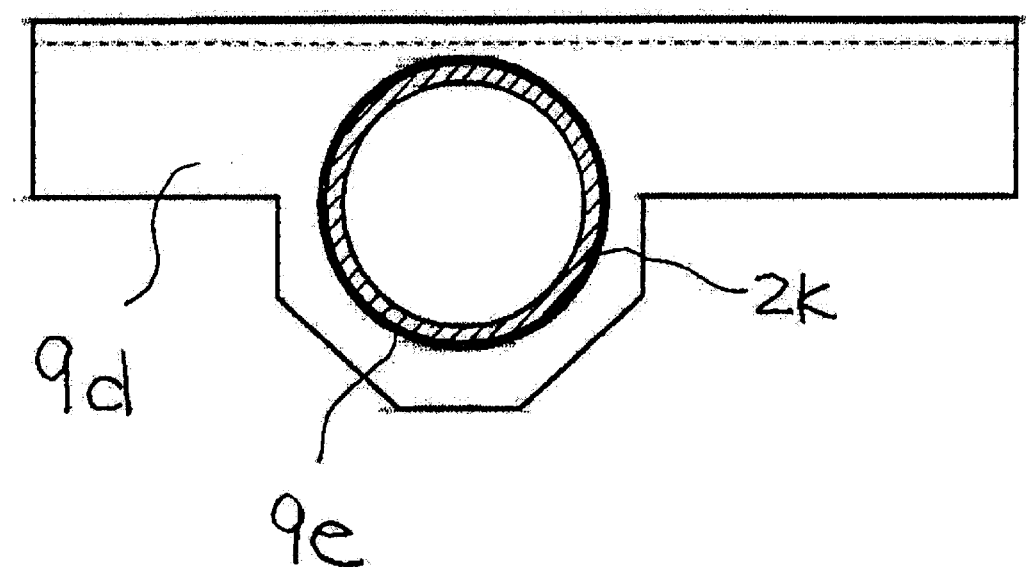
FIG. 6 illustrates an engagement state of the disc guide and the main chassis.

FIG. 5 illustrates the relationship between the aforementioned guide plate 9 and the main chassis 2. The guide plate 9 has the one end 9b coupled to the coupling portion 13a of the slide member 13 and the other end 9c formed with an engagement surface 9d for moving the main chassis 2 into contact with and away from a left wall 2h (plate on the main chassis side), in which the engagement surface 9d is provided with a fit hole 9e. On the other hand, a triangular projection 2k is formed on the left wall 2h of the main chassis 2 for fitting into the fitting hole 9e. When the triangular projection 2k is fitted into the fitting hole 9e of the guide plate as shown in FIG. 6, the projection 2k prevents any motion of the left side 1a of the floating chassis 1 with respect to the main chassis 2 in up and down, right and left, and forward and backward directions.

Figure 7:
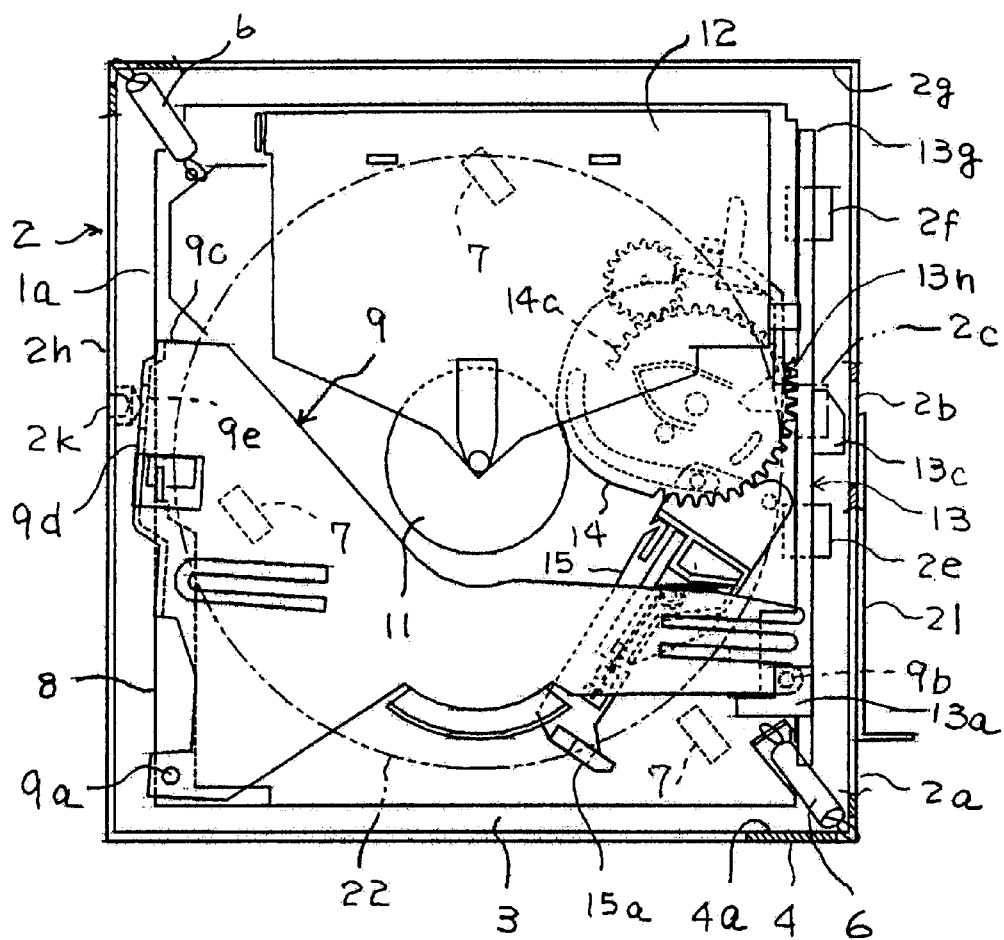
FIG. 7 is a plan view illustrating the disc player when a disc is played back.
Figure 8:
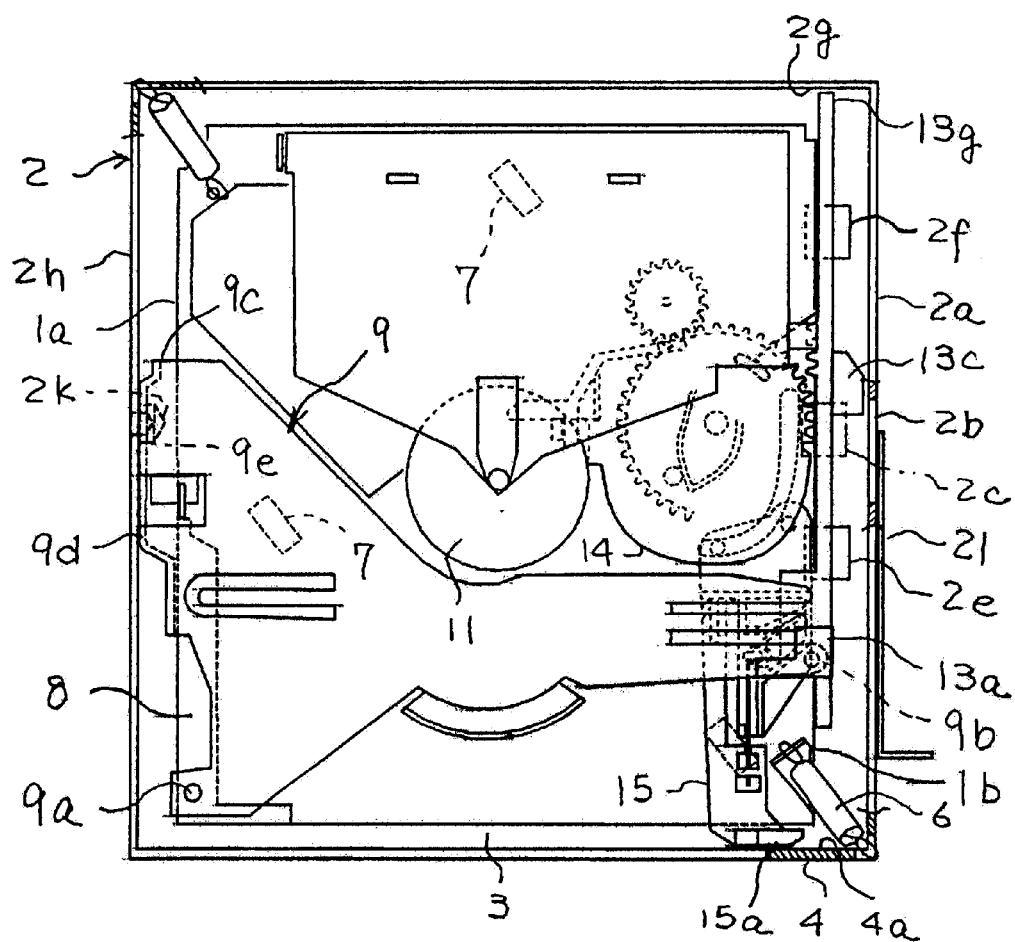
FIG. 8 is a plan view illustrating the disc player when a floating chassis is fixed to the main chassis.

The operation involved in fixing the floating chassis 1 to the main chassis 2 is described below with reference to FIGS. 7 and 8. FIG. 7 shows the disc player when the disc 22 is played back, while the disc 22 is held on the turntable 10 by the clamper 11. In this event, the slide member 13 is at a position after a forward movement, and the second convex portion 13c of the slide member 13 opposes the relief hole 2b to permit a rightward movement of the floating chassis. The third convex portion 13d is separated from the position where it engages with the bent piece 2c to permit an upward movement of the floating chassis 1. On the other hand, the fourth and fifth convex portions 13e, 13f are separated from the positions where they engage with the angle pieces 2e, 2f to permit a downward movement of the floating chassis 1. The sixth convex portion 13g is separated from the rear wall 2g to permit a backward movement of the floating chassis 1. The push-in piece 15a of the push-in lever 15 is pivoted to the position where the disc 22 is pushed into the playing position, and it is separated from the inner surface 4a of the front wall 4 of the main chassis 2 to permit a forward movement of the floating chassis 1.

On the other hand, the slide member 13 pivots the guide plate 9 in a clockwise direction about the axis hole 9a to separate the engagement surface 9d of the guide plate 9 from the left wall 2h of the main chassis 2. The fitting hole 9e is separated from the triangular projection 2k to permit a movement of the floating chassis 1 with respect to the main chassis 2 in the up and down, forward and backward, and right and left directions. In this manner, the floating chassis 1 is released from all restrictions on movements with respect to the main chassis, and is supported movably in all directions inside the main chassis 2 by the dampers 7 and the springs 6.

In FIG. 7, the floating chassis 1 is movable to the main chassis 2 in each of the up and down, forward and backward, and right and left directions. In this state, when the eject lever 21 is pushed in, the trigger lever 20 removes the restriction on the toothless gear 19 to transmit the rotation of the motor 16 to the push-back lever 14 which is rotated in the counterclockwise direction. The rotation of the push-back lever 14 causes the partial gear 14c to move the slide member 13 backward through the rack 13h. The movement of the slide member 13 brings the sixth convex portion 13g closer to the rear wall 2g of the main chassis 2.

When the backward movement of the slide member 13 is ended, the second convex portion 13c of the slide member 13 opposes the inner surface of the right wall 2a to prevent the floating chassis 1 from moving to the right. The third convex portion 13d engages with the bent piece 2c to prevent an upward movement of the floating chassis 1. On the other hand, the fourth and fifth convex portions 13e, 13f engage with the angle pieces 2e, 2f to prevent a downward movement of the floating chassis 1. The sixth convex portion 13g abuts to the rear wall 2g to prevent a backward movement of the floating chassis 1. On the other hand, the push-in piece 15a of the push-in lever 15 is pivoted to the position where the disc 22 is ejected from the insertion slot 3 by the push-back lever 14 and the push-in piece 15a is opposed to the inner surface 4a of the front wall 4 of the main chassis 2 to prevent a forward movement of the floating chassis 1. With these actions, the right side 1b of the floating chassis 1 is prevented from any movement to the main chassis 2 in the forward and backward, up and down, and right directions.

On the other hand, the slide member 13 moving backward pivots the guide plate 9 in the counterclockwise direction about the axis hole 9a to abut the engagement surface 9d of the guide plate 9 to the left wall 2g, thereby preventing the floating chassis 1 from moving to the left. In addition, the triangular projection 2k fits into the fitting hole 9e of the engagement surface 9d to prevent any movement of the left side 1a of the floating chassis 1 in the up and down, and forward and backward directions with respect to the main chassis 2. With these actions, the left side 1a of the floating chassis 1 is prevented from any movement in the forward and backward, up and down, and left directions with respect to the main chassis 2.

As described above, the disc player according to the foregoing embodiment achieves the fixing of the floating chassis 1 to the main chassis 2 by the slide member 13, guide plate 9 and the push-in lever 15 when the disc 22 is pushed into the insertion slot 3 through a disc ejecting operation. Since the slide member 13 is provided only on the right side of the floating chassis, the disc player can be reduced in size. In addition, since the slide member 13 and the guide plate 9 are the only essential members in the disc player, it is unnecessary to provide an additional member dedicated to the fixing of the floating chassis 1 to the main chassis 2 or release of the floating chassis 1 from the main chassis 2. Accordingly, the structure can be simplified.

While the foregoing embodiment employs the push-in lever 15 directly engaging with the periphery of a disc as the push-in member, the push-in member is not limited thereto. Instead, a roller support plate for supporting a roller may be used in a disc transfer apparatus which sandwiches a disc between a disc guide and the roller to transfer the disc through the rotation of the roller.

In the disc floating chassis fixing device of the present invention, the slide member 13 (i.e., control member) disposed on the one side of the floating chassis is coupled to the push-in member 15 for transferring a disc to the playing position and to the disc guide 9 for guiding the disc to the playing position such that they are interlocked. When no disc is loaded on the floating chassis, the slide member 13, the push-in member 15 and the disc guide 9 engage with the main chassis 2. Since the floating chassis 1 can be fixed to the main chassis 2 by the slide member 13 provided on the one side of the floating chassis, the disc player can be reduced in size. In addition, the floating chassis 1 is fixed to the main chassis 2 by using the slide member 13 and the disc guide 9 which are necessarily provided for the disc player and the push-in member 15, the structure can be simplified.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A floating chassis fixing device for a disc player, comprising:

a floating chassis mounted thereon with a disc guide for guiding a disc inserted from a disc insertion slot to a playing position;

a push-in member pivotally movably associated with the insertion of the disc to transfer the disc to the playing position; and a control member movably associated with a disc ejecting operation to separate a disc damper from the disc at the playing position so as to free the disc from being clamped in a main chassis for supporting the floating chassis in a floating state and for fixing the floating chassis when a disc is ejected from the disc insertion slot, wherein the disc guide and the push-in member are pivoted in association with a movement of the control member, and the control member, the disc guide and the push-in member are abutted to the main chassis in association with the disc ejecting operation to fix the floating chassis to the main chassis.

2. The floating chassis fixing device for a disc player according to claim 1, wherein the control member is abutted to a rear end of the main chassis, the push-in member is abutted to a front end of the main chassis, and the control member is abutted to the top and bottom of the main chassis on one side of the floating chassis, and the disc guide is engaged with a side plate of the main chassis on the other side of the floating chassis to fix the floating chassis to the main chassis when the disc is ejected from the disc insertion slot.

3. The floating chassis fixing device for a disc player according to claim 2, wherein the disc guide is engaged with the side plate of the main chassis by fitting a convex portion into a concave portion when a disc is ejected from the disc insertion slot.

4. The floating chassis fixing device for a disc player according to claim 1, wherein the control member abuts to a rear wall of the main chassis to fix the floating chassis to the main chassis.

5. The floating chassis fixing device for a disc player according to claim 1, wherein the disc guide abuts to a side wall of the main chassis to fix the floating chassis to the main chassis.

* * * * *